LINEAR DELAY CIRCUIT

Filed Oct. 11, 1963 2 Sheets-Sheet 1

INVENTOR.
SAMUEL W. SCOTT, JR.
BY H. M. Saragovitz,
E. J. Kelly & H. Berl.

INVENTOR.
SAMUEL W. SCOTT, JR.
BY
H. M. Saragovitz,
E. J. Kelly & H. Berl 3,225,221
Patented Dec. 21, 1965

3,225,221

LINEAR DELAY CIRCUIT

Samuel W. Scott, Jr., Las Cruces, N. Mex., assignor to the United States of America as represented by the Secretary of the Army Filed Oct. 11, 1963, Ser. No. 315,725
2 Claims. (Cl. 307—88.5)
(Granted under Title 35, U.S. Code (1952), sec. 266)

The invention described herein may be manufactured and used by or for the Government for governmental purposes, without the payment to me of any royalty thereon.

This invention relates to linear delay circuits and more particularly to a transistorized device wherein the delay or pulsewidth is controlled by control voltages and passive elements.

The linear delay circuit of the invention performs a function similar to the vacuum tube phantastron, sanaphant and sanatron circuits, but with a much wider range of delay and is not dependent on the characteristics of active elements employed, but solely on four passive elements and two control voltages. The circuit is useful as an active delay element and gate generator where the delays or pulsewidths can be controlled by a D.-C. voltage instead of changing the value of a resistor or capacitor in the timing network. When used as a delay or gate generator the circuit is stable and will not respond to extraneous triggers until the circuit resets itself and, in addition, it is capable of handling duty cycles in excess of 95%. If the circuit of the invention is triggered by an external command circuit, it can convert pulse amplitude modulation to pulse duration modulation with the linearity of the voltage-to-time conversion determined entirely by the linearity of the bootstrap sawtooth generator. If two linear delay circuits of the invention are connected in a ring, a square wave will be generated with a period equal to the sum of the individual pulsewidths. Because these pulsewidths are a linear relation of the control voltage, the circuit will act as a voltage controlled oscillator with a very wide range or a high sensitivity, whichever is desired.

Figure 1:
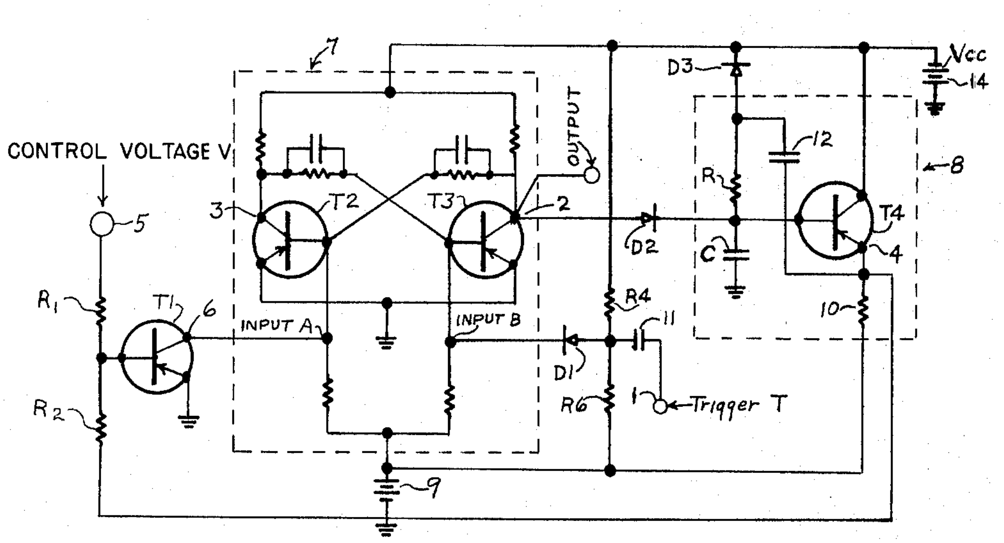
Figure 2:
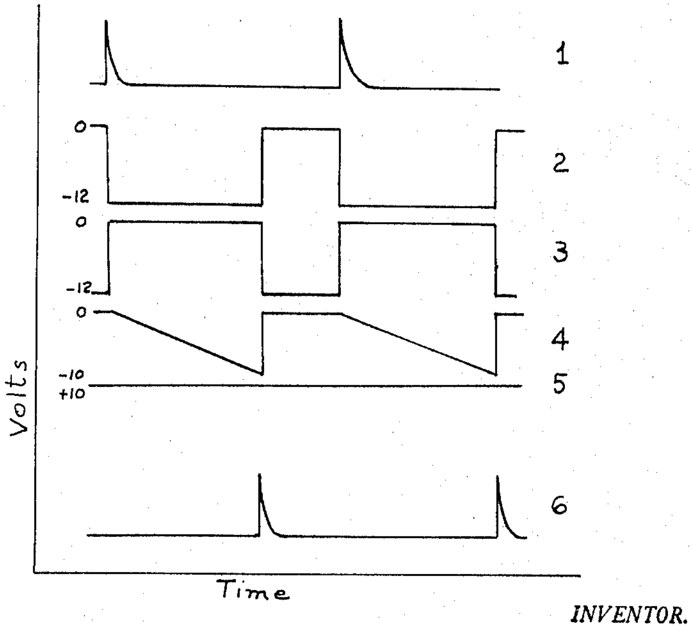
Figure 3:
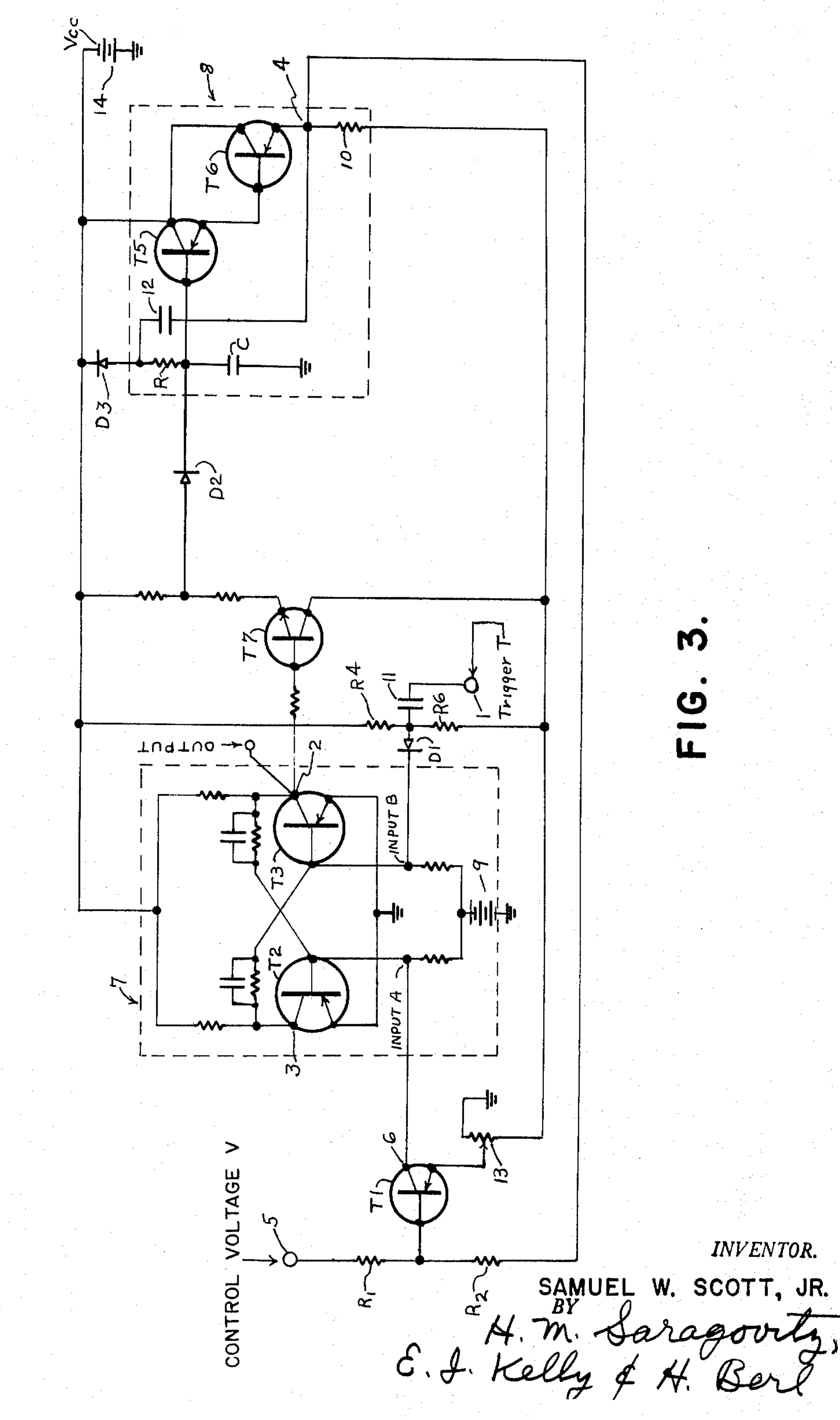

The features of the present invention which are believed to be novel are set forth with particularity in the appended claims. The organization and manner of operation, together with further objects and advantages thereof may be best understood by reference to the following description taken in conjunction with the accompanying drawings, in the several figures of which like numerals identify like elements, and in which:

FIGURE 1 is a schematic diagram of one embodiment of the invention;

FIGURE 2, graphs 1, 2, 3, 4, 5 and 6, illustrates the waveforms obtained at the corresponding points 1, 2, 3, 4, 5 and 6 of FIGURE 1;

FIGURE 3 is a schematic diagram of another embodiment of the invention.

Referring now particularly to FIGURE 1 which illustrates the linear delay circuit of the invention wherein numeral 7 indicates a bistable multivibrator employing transistors T2 and T3, each of which have base, collector and emitter elements. The bistable multivibrator is provided with an input A and an input B connected to the base of transistors T2 and T3, respectively. Numeral 8 indicates a sawtooth generator comprising a transistor T4 with a timing circuit consisting of a series connected resistor R and capacitor C. The base of transistor T4 is connected to the intermediate point of the series connected resistor and capacitor which in turn is connected to the cathode of D2, the anode of which is connected to the collector of transistor T3. Diode D3 has its cathode connected to collector battery voltage $Vcc$ and its anode to the aforementioned resistor R. Battery 9 which provides a reverse bias for the base-emitter junctions of transistors T2 and T3 also places a positive bias on the emitter of transistor T4 through resistor 10. Battery 14 provides the collector voltage for transistors T2, T3 and T4. The positive trigger voltage T is applied through series connected capacitor 11 and diode D1 to the input B of transistor T3. The base of trigger amplifier T1 is connected to the intermediate point of a voltage divider consisting of series connected input resistor $R_1$ and feedback resistor $R_2$. As shown in the drawings, a control voltage V is applied to input resistor $R_1$ at point 5. Feedback resistor $R_2$ is coupled to the emitter of transistor T4 whereby a negative going sawtooth voltage is applied to the base of trigger amplifier T1. The output of trigger amplifier T1 is taken at its collector element and applied to input A of the bistable multivibrator 7. In the embodiment of the invention shown in schematic diagram of FIGURE 3, a potentiometer 13 is connected between the positive pole of battery 9 and the ground and the rotor thereof is connected to the emitter of trigger amplifier T1 whereby a slight positive bias is applied to the emitter thereby offsetting the small forward drop in transistor T3 and diode D2 so that the voltage versus time curve intersect zero. The NPN transistor T7 isolates the bistable multivibrator 7 from the capacitor C whereby interference with the regenerative action of the bistable multivibrator is prevented when large values for capacitor C are used. Also in the embodiment shown in FIGURE 3, the emitter follower of the sawtooth generator 8 has been compounded, as shown in the arrangement of transistors T5 and T6, in order to obtain greater linearity in the sawtooth voltage applied to the base of trigger amplifier T1.

The timing of linear delay circuits is in accordance with the following formula:

$$T=kRC \qquad (1)$$

where $T$=time delay
$R$=timing resistor
$C$=timing capacitor
$k$=constant of proportionality which for the subject invention is defined below.

The control voltage V which is applied to the base of trigger amplifier T1 through the input resistor $R_1$ must satisfy the following condition:

$$V=(R_1/R_2)(Vcc) \qquad (2)$$

where $V$=control voltage (must be of opposite polarity to Vcc).
$R_1$ and $R_2$=input and feedback resistors, respectively.
$Vcc$=collector voltage.

From equation (2) the constant of proportionality $k$ can be defined as $$k=(R_2/R_1)(V/Vcc) \qquad (3)$$

Hence the pulsewidth or delay is determined by $$T=(R_2R_1)(V/Vcc)(RC) \qquad (4)$$

The amplitude of the sawtooth voltage at point 4 is determined by $$V_{St}=(R_2/R_1)(V) \qquad (5)$$

As can be seen from Equation 5, the amplitude of the sawtooth voltage is determined by the control voltage V and the ratio of $R_2$ to $R_1$ as in the gain equation of an operational amplifier (i.e. $E_o=(R_f/R_1)E_1$). Furthermore it can be seen that the delay (Equation 4) is controlled by the ratios: $R_2$ to $R_1$ and V to $V_{cc}$ and the time constant RC. Thus the four passive elements are $R_1$, $R_2$, R and C and the two critical voltages are V and $V_{cc}$.

As can be best seen by reference to FIGURE 1, the bistable multivibrator 7 is a saturated transistor logic design wherein the easiest mode of triggering is to turn off the saturated transistor. The basic linear delay circuit shown is a PNP circuit and the logic levels are negative, i.e. "one" is minus 12 volts D.-C. and "zero" is 0 volts D.-C. The stable state of the linear delay circuit is with transistor T3 saturated, transistor T2 "OFF," transistor T1, the trigger amplifier, back biased and transistor T4 of the bootstrap sawtooth oscillator clamped to ground through diode D2 and transistor T3. The positive edge of a waveform coupled into the trigger input, point 1, having a minimum amplitude of eight to ten volts and a rise time of 1.0 microsecond or better will trigger the circuit. This amplitude and rise time requirement is governed by the size of the input capacitor 11 and the two resistors R4 and R6, the back biasing of diode D1 by the resistors R4 and R6 of approximately minus three volts, and the amount of current required to turn off transistor T3. Diode D1 is back biased for the purpose of minimizing noise sensitivity.

If a waveform such as described above is applied to the trigger input, point 1, the bistable multivibrator will flip via its regenerative action to the "SET" condition. In this condition transistor T3 is "OFF," transistor T2 is saturated, trigger transistor T1 is back biased and the clamp diode D2 is uncoupled from the sawtooth generator allowing the generator to approach minus 12 volts. This state of the linear delay circuit of the invention is referred to as the quasi-stable state. In regard to the bootstrap sawtooth generator, when transistor T3 flipped to approximately minus 11 volts, diode D2 is back biased uncoupling the sawtooth generator from the bistable multivibrator and the base of transistor T4 will start moving toward minus 12 volts D.-C. The capacitor 12 connected between the emitter of transistor T4 and the junction of diode D3 and resistor R can, for all practical purposes, be considered a floating power supply of approximately 12 volts. Now consider the positive terminal of this supply to be tied to the emitter of transistor T4 and the negative terminal to the anode of diode D3. As the base of transistor T4 moves toward minus 12 volts D.-C., so will its emitter, thereby back biasing D3 and uncoupling the charging network from its reference. The net result is a constant voltage across R, hence a constant current charging circuit for capacitor C. As a result the sawtooth generator output at point 4 will be a negative going voltage which is applied to the base of trigger amplifier T1 through resistor $R_2$. The control voltage V, through resistor $R_1$, is also applied to the base of trigger amplifier T1. In the stable state, transistor T1 will be back biased by plus five volts. When the sawtooth generator output reaches minus ten volts, the base of transistor T1 will start to come out of the back bias condition. In the quasi-state transistor T2 is saturated, hence the collector load of transistor T1 looks like a 10K ohm load to minus 11 volts in parallel with a 100 pf. capacitor and a forward biased diode connected between the collector of transistor T1 and ground formed by base-emitter junction of transistor T2. As transistor T1 goes into saturation, transistor T2 is pulled out of saturation starting the regenerative action of the bistable multivibrator and then the multivibrator will flip back to its reset state, transistor T2 off, transistor T3 saturated, capacitor C discharges through diode D2 and transistor T3 and the sawtooth generator will be in its stable state of zero output. The trigger amplifier T1 will be back biased by plus five volts and linear delay circuit of the invention has therefore returned to its stable state and will remain therein until the next trigger voltage is applied to point 1.

I claim:

1. A linear delay circuit comprising in combination: first and second transistors each having base, emitter and collector electrodes; means cross-connecting said base electrodes and said collector electrodes to provide a bistable circuit; an input terminal connected to the base electrode of said first transistor; an input terminal connected to the base electrode of said second transistor; the emitter electrode of said first transistor and said second transistor being connected to ground; an output terminal connected to the collector electrode of said second transistor; a sawtooth generator consisting of a third transistor having base, emitter and collector electrodes and a timing circuit comprising a series connected resistor and capacitor and having an RC time constant; a junction formed by one terminal of said resistor and one terminal of said capacitor connected to the base electrode of said third transistor, the other terminal of said capacitor being connected to ground; a collector supply voltage means having one terminal grounded; the collector electrodes of said first, second and third transistors connected to another terminal of said collector supply voltage means; a first diode having a cathode connected to said collector supply voltage means and an anode to the resistor of said timing circuit; a second diode having an anode connected to the collector electrode of said second transistor and a cathode connected to said junction of the timing circuit; a trigger amplifier consisting of a fourth transistor having base, emitter and collector electrodes, the emitter electrode of said fourth transistor being connected to ground and the collector electrode thereof connected to the input terminal connected to the base electrode of said first transistor of the bistable circuit; a feedback resistor, said feedback resistor coupling an output of the sawtooth generator at the emitter electrode of the third transistor to the base electrode of said fourth transistor whereby the sawtooth generator output of the sawtooth generator is applied to the base electrode of said fourth transistor; a control voltage; an input resistor having one terminal thereof connected to the base of said fourth transistor and the other terminal thereof to said control voltage; and means for applying a trigger pulse to the input terminal connected to the base electrode of said second transistor; the width of the pulse obtained at the said output terminal of the second transistor of the bistable circuit being determined by the ratio of the ohmic value of the feedback resistor to ohmic value of the input resistor times the ratio of the value of the control voltage to the value of the collector supply voltage means times the RC time constant of the timing circuit of the sawtooth generator.

2. A linear delay circuit comprising in combination: first and second transistors each having base, emitter and collector electrodes; means cross-connecting said base electrodes and said collector electrodes to provide a bistable circuit; an input terminal connected to the base electrode of said first transistor; an input terminal connected to the base electrode of said second transistor; the emitter electrode of said first and second transistors being connected to ground; an output terminal connected to the collector electrode of said second transistor; a sawtooth generator consisting of a third transistor having base, emitter and collector electrodes and a timing circuit consisting of a series connected resistor and capacitor and having RC time constant, a junction formed by one terminal of said resistor and one terminal of said capacitor connected to the base electrode of said third transistor, the other terminal of said capacitor connected to ground; a collector supply voltage means having one terminal grounded; the collector electrodes of said first, second and third transistors connected to another terminal of said collector supply voltage means; a first diode having a cathode connected to said collector supply voltage means and an anode connected to another terminal of the resistor of said timing circuit; means to prevent interference with the regenerative action of said bistable circuit when large values for the capacitor of said timing circuit are used consisting of a fourth transistor of conductance opposite to the conductance of said first, second and third transistors having base, emitter and collector electrodes, a voltage divider provided with an intermediate tap and having one end connected to said collector supply voltage means and its other end to the emitter electrode of said fourth transistor, the base electrode of said fourth transistor coupled to the collector electrode of said second transistor, the collector electrode of the fourth transistor coupled to ground; a second diode having an anode connected to the intermediate tap of said voltage divider and a cathode connected to the said junction of the timing circuit; a trigger amplifier consisting of a fifth transistor provided with base, emitter and collector electrodes, the emitter electrode of said fifth transistor being connected to ground and the collector electrode connected to the input terminal connected to the base electrode of said first transistor; a feedback resistor, said feedback resistor coupling an output of said sawtooth generator at the emitter electrode of said third transistor to the base electrode of said fifth transistor whereby the sawtooth generator output of the sawtooth generator is applied to the base electrode of said fifth transistor; a control voltage; an input resistor having one terminal thereof connected to the base electrode of said fifth transistor and the other terminal thereof to said control voltage; and means for applying a trigger pulse to the input terminal connected to the base electrode of said second transistor; the width of the pulse obtained at the said output terminal of the second transistor of the bistable circuit being determined by the ratio of the ohmic value of the feedback resistor to the ohmic value of the input resistor times the ratio of the value of the control voltage to the value of the collector supply voltage means times the RC time constant of said timing circuit.

References Cited by the Examiner

UNITED STATES PATENTS

| | | | |
|---|---|---|---|
| 3,049,165 | 8/1962 | Brockman | 307—88.5 |
| 3,085,165 | 4/1965 | Schaffert et al. | 307—88.5 |

ARTHUR GAUSS, *Primary Examiner.*

J. HEYMAN, *Assistant Examiner.*